(12) United States Patent
Kakuta et al.

(10) Patent No.: US 6,378,160 B1
(45) Date of Patent: Apr. 30, 2002

(54) WIPER APPARATUS FOR MOTOR VEHICLES

(75) Inventors: Atsushi Kakuta, Wako; Yuji Igarashi, Ohta, both of (JP)

(73) Assignees: Honda Giken Kogyo Kabushiki Kaisha, Tokyo; Mitsuba Corporation, Gunma, both of (JP)

(*) Notice: Subject to any disclaimer, the term of this patent is extended or adjusted under 35 U.S.C. 154(b) by 0 days.

(21) Appl. No.: 09/303,542

(22) Filed: May 3, 1999

(30) Foreign Application Priority Data

May 22, 1998 (JP) ............................................ 10-141408

(51) Int. Cl.⁷ .............................. B60S 1/16; B60S 1/06
(52) U.S. Cl. ............. 15/250.31; 15/250.3; 403/DIG. 3; 384/561; 384/624; 384/903
(58) Field of Search ........................... 15/250.3, 250.31, 15/250.34, 250.25, 250.16; 403/2, DIG. 3; 384/624, 903, 561; 74/42, 43; 296/96.17

(56) References Cited

U.S. PATENT DOCUMENTS

| | | | |
|---|---|---|---|
| 5,142,728 A | * 9/1992 | Yamamoto et al. | 15/250.3 |
| 5,182,957 A | * 2/1993 | Bohmer et al. | 15/250.3 |
| 5,337,439 A | * 8/1994 | Frey et al. | 15/250.3 |
| 5,735,171 A | * 4/1998 | Moute et al. | 15/250.31 |

FOREIGN PATENT DOCUMENTS

| | | |
|---|---|---|
| EP | 0 806 329 A | 11/1997 |
| JP | Y2-58-48921 | 11/1983 |
| JP | Y1-60-261 | 1/1985 |
| JP | Y1-61-75365 | 5/1986 |
| JP | Y1-4-50051 | 4/1992 |

* cited by examiner

*Primary Examiner*—Gary K. Graham
(74) *Attorney, Agent, or Firm*—Oliff & Berridge, PLC

(57) ABSTRACT

A wiper apparatus for use in a motor vehicle with a pivot extending from an interior side of a vehicle body toward the external and penetrating a pivot holder that is fixed integrally onto the vehicle body. The pivot is rotatable with respect to the pivot holder and further holds a wiper arm at its penetrating tip portion. An outer circumferential surface of the pivot has an engaging groove that is fitted with an elastic retainer ring to retain the pivot on the pivot holder. An upper side surface of the engaging groove is an inclined surface so that the retaining ring can get out of the engaging groove with the aid of the inclined groove side surface when the pivot is pressed downwardly. Thus, the pivot can be easily removed from the pivot holder for replacement or the like, and if a large shock load acts on the pivot, it is possible to prevent the shock load from reaching the entire wiper apparatus or the vehicle body.

4 Claims, 5 Drawing Sheets

Fig. 4(A) RELATED ART
Fig. 4(B) RELATED ART
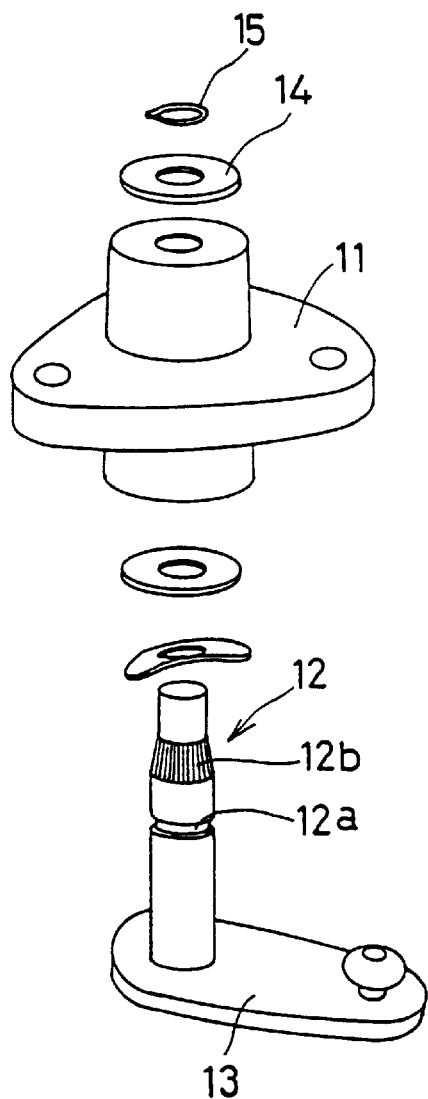
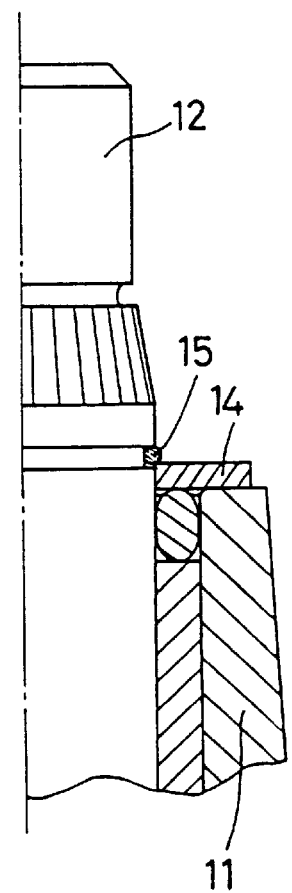

WIPER APPARATUS FOR MOTOR VEHICLES

BACKGROUND OF THE INVENTION

1. Field of Invention

The present invention relates to an industrial field of a motor vehicle wiper apparatus to be installed on motor vehicles such as passenger cars for private use, buses and trucks to wipe their windshields (or window) surfaces.

2. Description of Related Art

In general, in this type of wiper apparatus for motor vehicles, as shown in FIGS. 4A and 4B, a pivot (wiper shaft) 12 is borne by a pivot holder (sleeve) 11 which is fixedly secured to a vehicle body side. The pivot 12 is rotatable around the axis of the pivot holder 11. A lower end portion of the pivot 12 is fixedly secured to a rocking link 13 which is connected to a wiper motor. An upper end portion of the pivot 12 is fixed to a proximal portion of a wiper arm. This structure causes a reciprocating wiping oscillation of the wiper arm accompanying a rotational drive of the wiper motor.

Furthermore, this apparatus requires that the pivot 12 be positioned and fixed with respect to the pivot holder 11 to prevent the pivot 12 from falling out of the pivot holder 11. For this reason, a design disclosed in Japanese Unexamined Utility Model Publication No. 4-50551 has been proposed, where a flat washer 14 is placed against a tip portion of a pivot 12 and a retainer ring 15. A portion of this retainer ring 15 is cut and the entire retainer ring 15 is fitted in an engaging groove 12a in an outer circumference of the pivot 12. The position of the engaging groove 12a corresponds to the top surface of the flat washer 14 so that the retainer ring 15 comes into contact with the flat washer 14 to retain pivot 12 on the pivot holder 11.

However, when this apparatus is incorporated into a vehicle body, the pivot 12 and the pivot holder 11 are treated as a single wiper pivot assembly. After the assembly is installed on a vehicle body, a wiper arm is set thereto. In this instance, during the conveyance of the aforesaid wiper pivot assembly, there is the risk that, for example, a thread groove 12b in the tip portion of the pivot 12 collides against other components and deforms.

To cope with such an event, the pivot 12 is taken out from the pivot holder 11 and replaced with a new pivot 12. However, removing the pivot 12 requires disconnecting the retainer ring 15. Removing the retainer ring 15 is a problem because the retainer ring 14 is not only made of a spring steel but is also small and fitted in the engaging groove 12a. Therefore, special tools which require a delicate touch are needed.

In addition, since some parts of the wiper apparatus, such as the wiper arm and the pivot, appear outside the vehicle body, they can directly undergo external shocks. In some cases the shock reaches, not only the wiper arm, the pivot and the pivot holder, but also the entire wiper apparatus. The shock can affect the fit of the wiper apparatus to the vehicle body and may even affect the vehicle body.

SUMMARY OF THE INVENTION

In this invention, a pivot rotatably extends from the vehicle body interior side to the exterior through a pivot holder that is fixed integrally onto a vehicle body. The pivot holds a wiper arm at its penetrating tip portion. An engaging groove is made in a pivot holder penetrating portion of the pivot and a retainer ring is fitted in the engaging groove to retain the pivot on the pivot holder. The retainer ring clamps down into the engaging groove. The retainer ring has ends which can be forced apart. The engaging groove is notched with an inclined groove side surface toward the tip of the pivot.

In this way, releasing the pivot from the pivot holder is a simple operation. Additionally, if an external large shock is received, the retainer ring disconnects from the engaging groove of the pivot, and the pivot absorbs the shock by moving downwardly from the pivot holder. Thus, the shock does not affect the entire wiper apparatus or the vehicle body. This decreases the number of parts to be replaced or repaired which reduces cost.

BRIEF DESCRIPTION OF THE DRAWINGS

The object and features of the present invention will become more readily apparent from the following detailed description of the preferred embodiment taken in conjunction with the accompanying drawings in which:

FIG. 4A is an exploded perspective view of a conventional wiper apparatus; and

FIG. 4B is a partial cross-sectional view of the conventional wiper apparatus.

DETAILED DESCRIPTION OF PREFERRED EMBODIMENTS

An embodiment of the present invention will be described hereinbelow with reference to the drawings.

Figure 1:
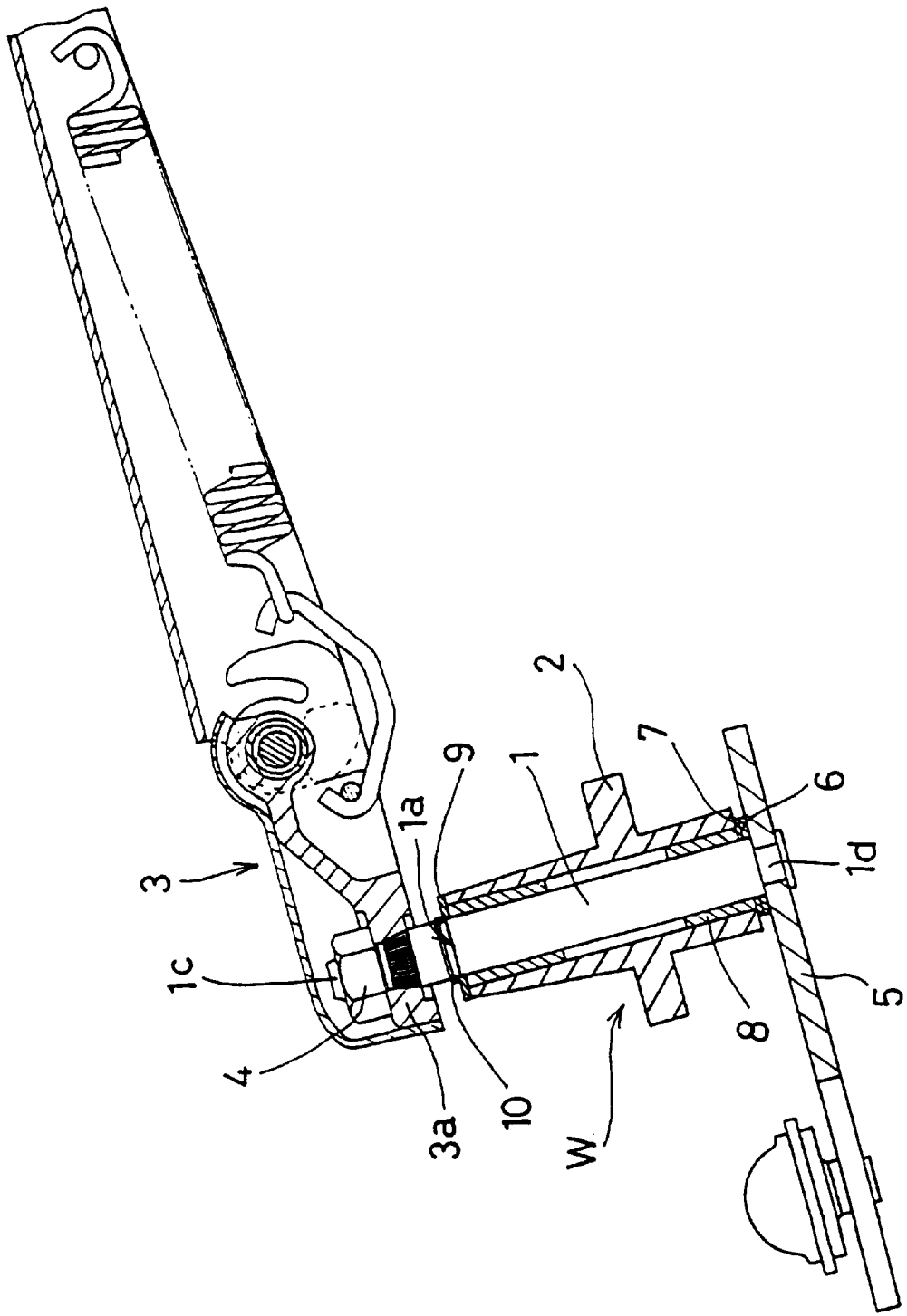
FIG. 1 is a partial cross-sectional view showing a wiper apparatus according to an embodiment of this invention.

In FIG. 1, a pivot 1 is pivotally supported in a pivot holder 2 that is fixedly secured to a vehicle body. The pivot 1 protrudes from the interior of the vehicle body to the external and is rotatable around its axis. The pivot 1 and pivot holder 2 constitute a wiper pivot assembly W. Further, an arm head 3a of a wiper arm 3 is integrally set through a nut 4 to a tip portion 1c of the pivot 1 that projects from a portion of the pivot holder 2 which protrudes from the vehicle body. A proximal portion 1d of the pivot 1 is fixedly secured to a link arm 5 which is connected and interlocked with a non-shown wiper motor. The link arm 5 rocks together with the pivot 1 in accordance with the operation of the wiper motor to cause the wiper arm 3 to wipe a surface of the windshield swingingly. This is similar to the conventional construction.

Also shown in the illustration, are a spring washer 6 and a flat washer 7 interposed between the pivot holder 2 and the link arm 5. A bushing 8 is between the pivot holder 2 and the pivot 1. A flat washer 9 is fitted over the pivot 1 and placed against the tip portions of the pivot holder 2 and the bushing 8 to retain the pivot. The flat washer 9 is in contact with a retainer ring 10 (with a cross-sectional center O), which is described below, in a contact-line state in cross-sectional view.

Also shown in the illustration, are a spring washer 6 and a flat washer 7 interposed between the pivot holder 2 and the link arm 5. A bushing 8 is between the pivot holder 2 and the pivot 1. A flat washer 9 is fitted over the pivot 1 and placed against the tip portions of the pivot holder 2 and the bushing 8 to retain the pivot.

Figure 3:
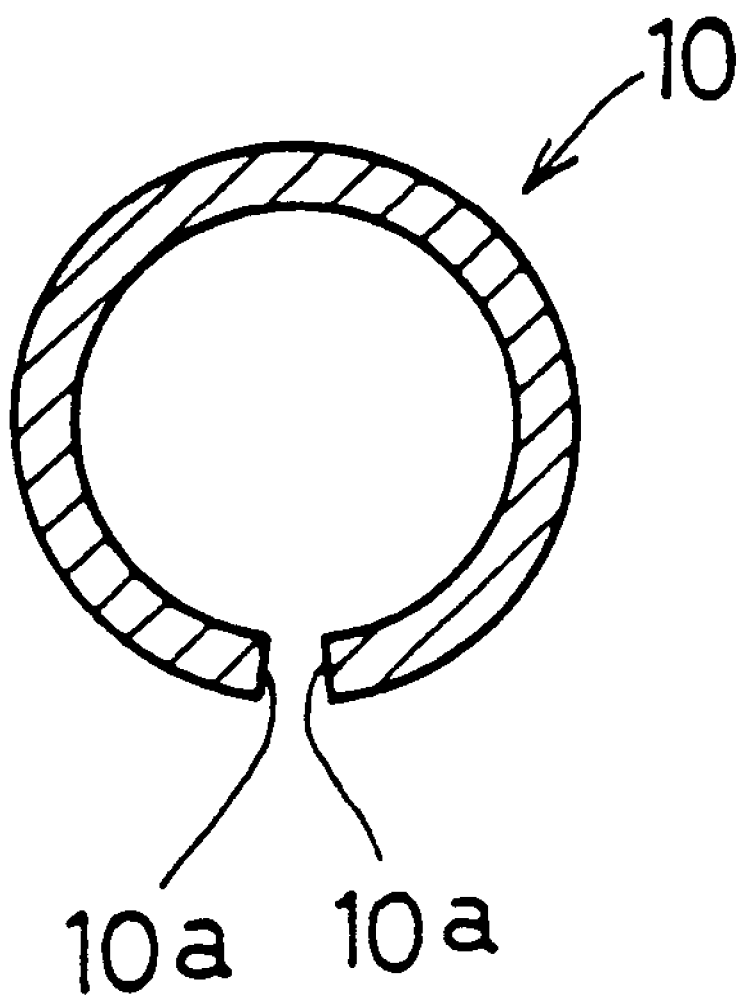
FIG. 3 is a plan cross-sectional view showing a retainer ring of the wiper apparatus.

Meanwhile, a retainer ring 10 is externally fitted in the engaging groove 1a in an outer circumferential surface of the pivot 1 to retain the pivot 1 in the wiper pivot assembly W. The retainer ring 10 is annular, has a circular, or round, cross-section and is made with an elastic material. The retainer ring 10 has an inner diameter that is smaller than or equal to the outer diameter of the engaging groove 1a so that it forcedly fits in the engaging groove 1a. In addition, the retainer ring 10 has ends (opening ends) 10a as shown in FIG. 3. When the ends 10a are spread out (widened forcedly), its inner diameter is enlarged to become greater than the outer diameter of the pivot 1. The retainer ring 10 is then fitted over the tip 1c of the pivot 1 and shifted around the outer circumferential section of the pivot 1 to engage the engaging groove 1a.

Figure 2A:
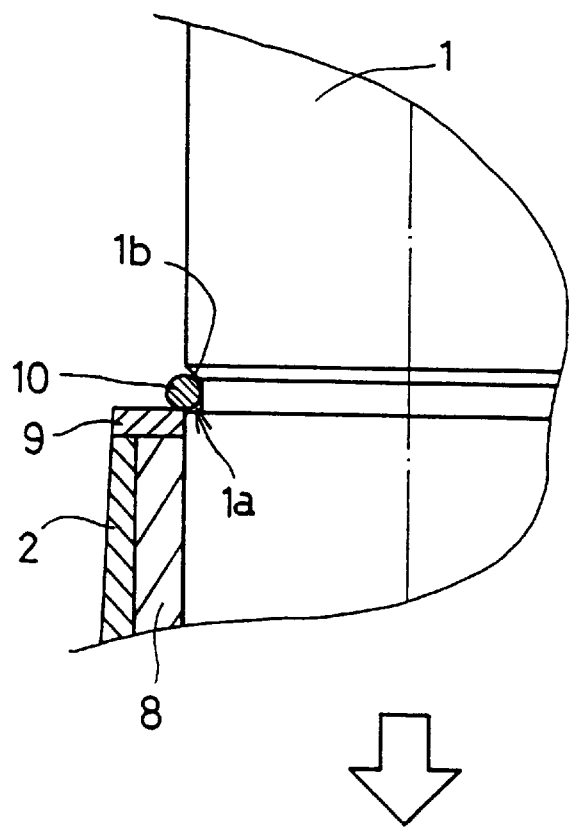
FIGS. 2A, 2B and 2C are enlarged cross-sectional views of a retainer ring in an engaging groove in accordance with this invention.
Figure 2B:
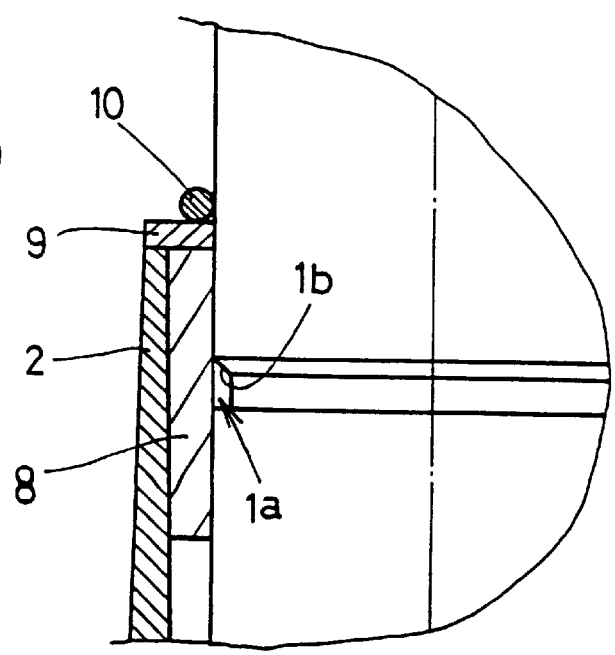
Figure 2C:
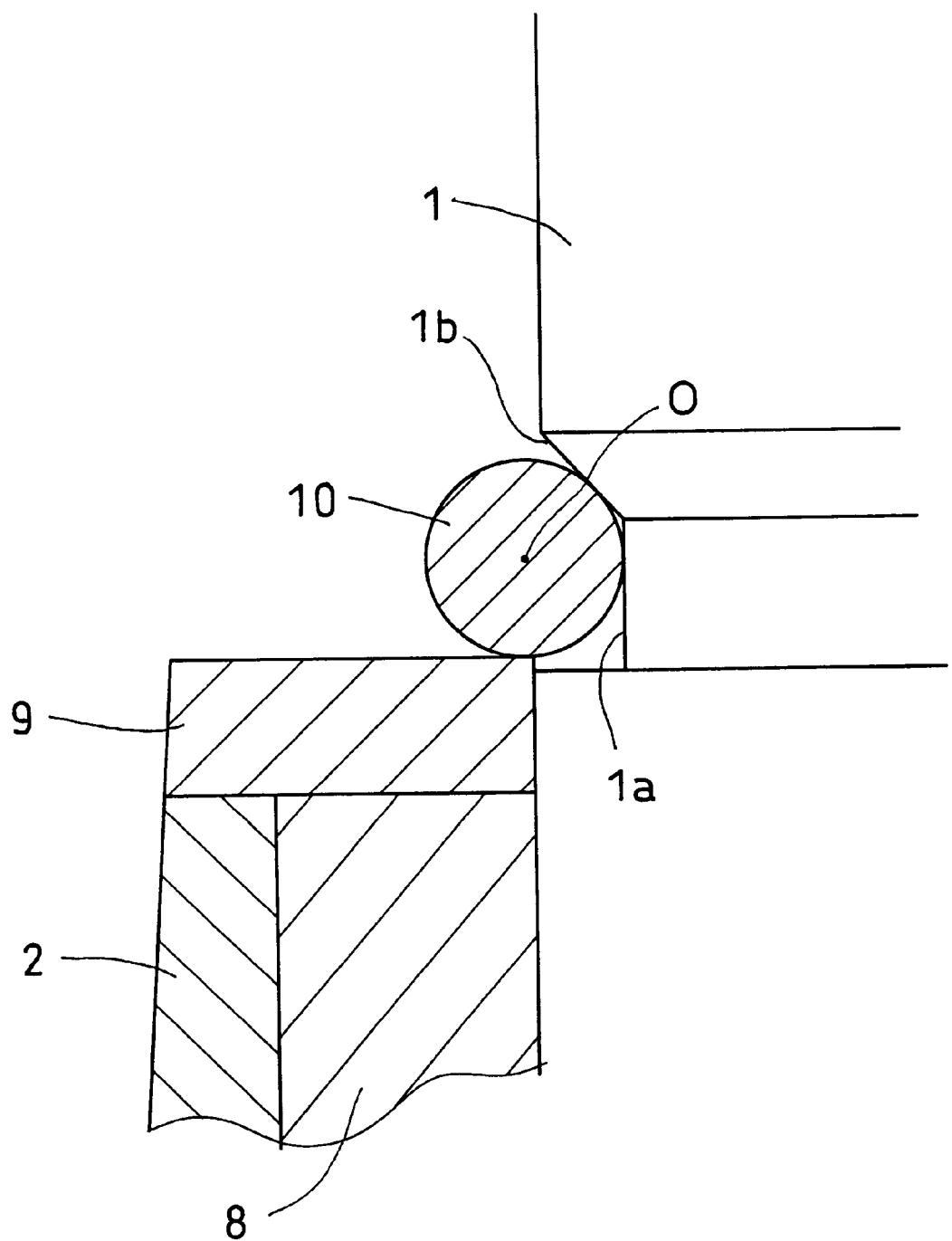

The engaging groove 1a of the pivot 1 is made by cutting its outer circumferential surface up to a predetermined depth. As shown in FIGS. 2(A) and 2(B) a groove side surface 1b on the upper side of the engaging groove 1a is a taperingly notched surface (inclined surface) that follows the outer circumferential surface of the pivot 1. If a load, (a load enabling the opening ends of the retainer ring 10 to be spread out forcedly) which exceeds a predetermined load acts downwardly on the pivot 1 of the wiper pivot assembly W, the movement of the retainer ring 10 onto the tapered surface 1b enlarges the retainer ring 10 to get out of the engaging groove 1a.

Accordingly, the pivot 1 can be removed from the pivot holder 2 because the retainer ring 10 fits in an engaging groove 1a that has a tapering upper side groove side surface 1b. However, if the downward load is within the preset range the retainer ring 10 does not come out from the engaging groove 1a and the pivot 1 is retained on the pivot holder 2 which permits the operation of the wiper pivot assembly W.

If the pivot 1 is to be replaced, a large load is exerted on the tip of the pivot 1. The retainer ring 10 is then forcedly enlarged by the upper side tapered groove side surface 1b and is released from the engaging groove 1a, whereupon the pivot 1 is removable from the pivot holder 2.

This means that, when the pivot 1 is to be removed from the pivot holder 2, unlike the conventional art, there is no need for special tools to enlarge the retainer ring 10. The pivot 1 can easily be released from the pivot holder 2 simply by pressing down on the pivot 1. That is, detaching the pivot from the pivot holder is simple and, the replacement efficiency of the pivot 1 is enhanced.

Moreover, if the pivot 1 is exposed to a large external shock, the retainer ring 10 moves out of the engaging groove 1a of the pivot 1 so that the pivot 1 shifts downwardly from the pivot holder 2 to absorb this shock. This eliminates the problem of the shock load affecting the entire wiper apparatus or the vehicle body and, hence, reduces the part replacement and repairs in the wiper apparatus, thus offering high economic effects.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. A wiper apparatus for a motor vehicle, the motor vehicle having a body, the apparatus comprising:

a pivot holder for fixing the wiper apparatus to the body of the motor vehicle;

a pivot shaft rotatably penetrating the pivot holder from the inside of the body to the outside of the body, the pivot shaft having a penetrating tip portion and an engaging groove in the penetrating tip portion, wherein the engaging groove has a side surface that is inclined toward the tip portion;

a wiper arm fixedly mounted to the penetrating tip portion;

a bushing disposed between the pivot holder and the pivot shaft;

a flat washer fitted over the pivot shaft and placed against the tip portion of the pivot holder and an end portion of the bushing; and a retaining ring made of elastic material with an annular shape and having a circular cross section, the retaining ring externally fitted from the side of the tip portion of the pivot shaft in the outer circumferential surface of the pivot to be forcedly fitted into the engaging groove to retain the pivot shaft on the pivot holder, each cross-section of the retaining ring contacting only a point on the flat washer, a point on a wall of the engaging groove and a point on the inclined side surface of the penetrating tip portion at corresponding points on an arc of the outer periphery of the circular cross section of the retaining ring.

2. The wiper apparatus of claim 1, wherein the retaining ring has ends which may be separated to enlarge an inner diameter of the retaining ring.

3. A wiper apparatus, comprising:

a pivot holder;

a pivot shaft rotatably penetrating the pivot holder, the pivot shaft having a tip portion extending out of the pivot holder and having an engaging groove with a side surface that is inclined toward the tip portion;

a wiper arm on the penetrating tip portion;

a bushing disposed between the pivot holder and the pivot shaft, a flat washer fitted over the pivot shaft and placed against the tip portion of the pivot holder and an end portion of the bushing; and a retaining ring in the engaging groove, each cross-section of the retaining ring contacting only a point on the flat washer, a point on a wall of the engaging groove and a point on the inclined side surface of the penetrating tip portion at corresponding points on an arc of the outer periphery of the circular cross section of the retaining ring.

4. The wiper apparatus of claim 3, wherein the retaining ring has ends which may be separated to enlarge an inner diameter of the retaining ring.

* * * * *